United States Patent
Hara

(10) Patent No.: US 10,755,092 B2
(45) Date of Patent: Aug. 25, 2020

(54) IMAGE FORMING APPARATUS THAT GIVES COLOR RESPECTIVELY DIFFERENT FROM ONE ANOTHER TO TEXT AREA FOR EACH OF VARIOUS KINDS OF LANGUAGES OR SELECTIVELY DELETES TEXT AREA FOR EACH OF VARIOUS KINDS OF LANGUAGE

(71) Applicant: KYOCERA Document Solutions Inc., Osaka (JP)

(72) Inventor: Nobuhiro Hara, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 111 days.

(21) Appl. No.: 16/144,413

(22) Filed: Sep. 27, 2018

(65) Prior Publication Data

US 2019/0095709 A1     Mar. 28, 2019

(30) Foreign Application Priority Data

Sep. 28, 2017 (JP) ................. 2017-188779

(51) Int. Cl.
*G06K 9/00* (2006.01)
*H04N 1/40* (2006.01)
(Continued)

(52) U.S. Cl.
CPC ....... *G06K 9/00456* (2013.01); *G06F 16/338* (2019.01); *G06F 16/3337* (2019.01); *G06F 40/103* (2020.01); *G06F 40/20* (2020.01); *G06F 40/263* (2020.01); *G06K 9/325* (2013.01); *H04N 1/40* (2013.01); *H04N 1/40062* (2013.01); *G06K 2209/01* (2013.01)

(58) Field of Classification Search
CPC ............. G06K 9/00456; G06K 9/325; G06K 2209/01; G06F 40/263; G06F 40/103; G06F 40/20; G06F 16/3337; G06F 16/338; H04N 1/40062; H04N 1/40
See application file for complete search history.

(56) References Cited

U.S. PATENT DOCUMENTS 9,442,923 B1 * 9/2016 Abou Mahmoud .. G06F 40/253
9,582,913 B1 * 2/2017 Kraft ....................... G06T 11/60
(Continued)

FOREIGN PATENT DOCUMENTS

JP    2016-210099 A    12/2016

*Primary Examiner* — Ming Y Hon
(74) *Attorney, Agent, or Firm* — IP Business Solutions, LLC

(57) ABSTRACT

An image forming apparatus including: an image scanning unit scanning an image of an original document; an image forming unit forming the image onto a recording sheet; a text extraction section extracting a text area from the image for each of various kinds of languages; an editing section, for each of the various kinds of languages, giving color different from one another to the text area or selectively deleting the text area; and a control section controlling the image forming unit so as to cause the image forming unit to form the text area for each of the various kinds of languages on the recording sheet in respective color given to the text area or to form a text area, which is among the text areas of the various kinds of languages and is not being deleted by the editing section, on the recording sheet.

6 Claims, 13 Drawing Sheets

(51) Int. Cl.
*G06F 16/338* (2019.01)
*G06F 16/33* (2019.01)
*G06K 9/32* (2006.01)
*G06F 40/20* (2020.01)
*G06F 40/103* (2020.01)
*G06F 40/263* (2020.01)

(56) References Cited

U.S. PATENT DOCUMENTS

| | | | |
|---|---|---|---|
| 2004/0210444 A1* | 10/2004 | Arenburg | G10L 15/18 704/277 |
| 2005/0114772 A1* | 5/2005 | Talley | G06F 40/166 715/268 |
| 2007/0022386 A1* | 1/2007 | Boss | G06F 9/543 715/764 |
| 2007/0219986 A1* | 9/2007 | Egozi | G06F 16/313 |
| 2007/0282462 A1* | 12/2007 | Sourov | G06Q 10/06 700/17 |
| 2008/0243842 A1* | 10/2008 | Liang | G06F 16/93 |
| 2011/0123115 A1* | 5/2011 | Lee | G06K 9/036 382/185 |
| 2013/0114849 A1* | 5/2013 | Pengelly | G06K 9/00979 382/103 |
| 2015/0032439 A1* | 1/2015 | Ogawa | G06F 9/454 704/2 |
| 2016/0352936 A1* | 12/2016 | Kanbayashi | H04N 1/393 |
| 2017/0315963 A1* | 11/2017 | Hanatani | G06F 40/103 |
| 2018/0376008 A1* | 12/2018 | Yoshimura | H04N 1/00 |

* cited by examiner

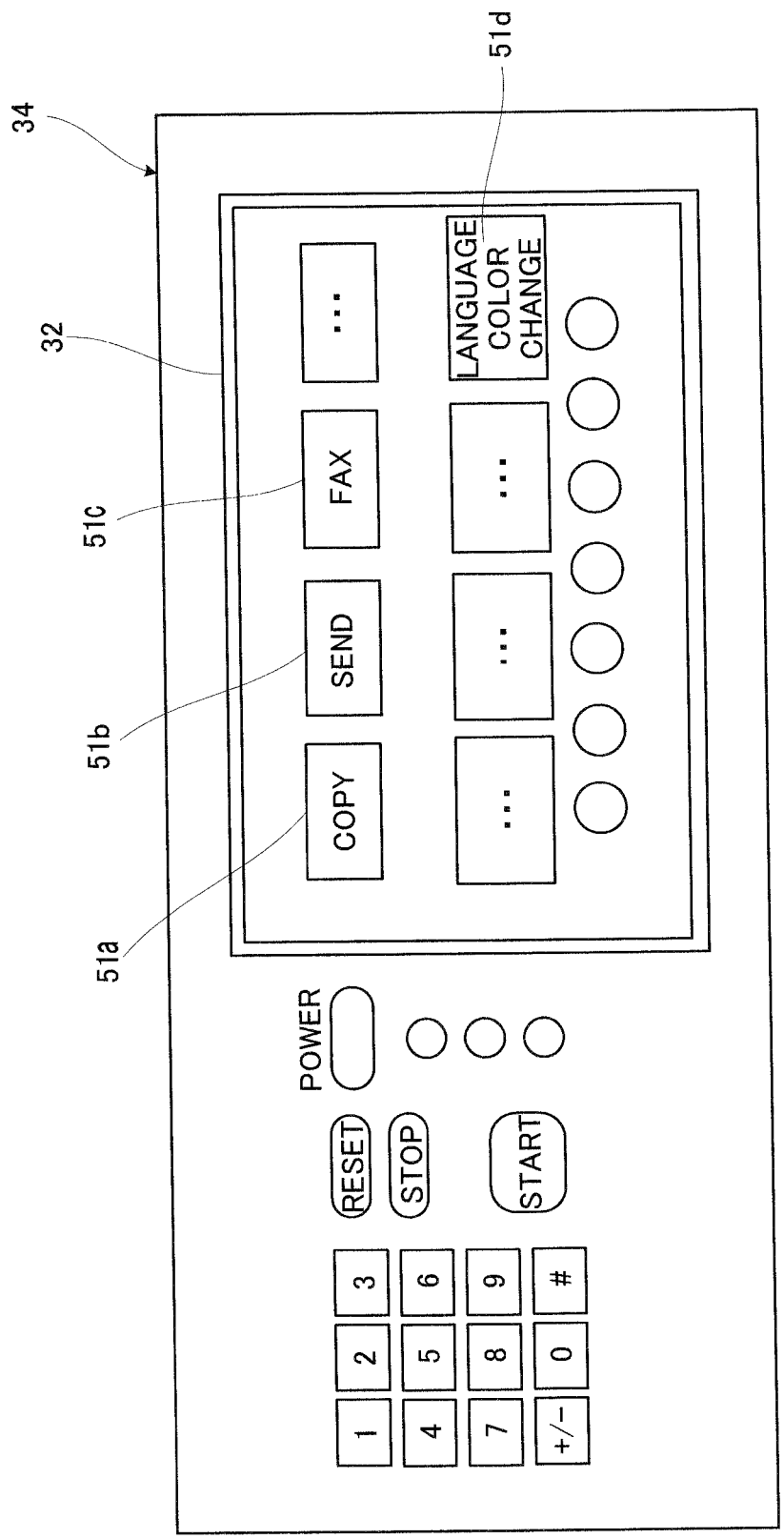

Fig.8

| JAPANESE | BLACK |
| --- | --- |
| ENGLISH | RED |
| RUSSIAN | GREEN |
| OTHER LANGUAGES | COLORLESS |
| LANGUAGE COLOR CHANGE | PERMIT/ PROHIBIT |

DT

IMAGE FORMING APPARATUS THAT GIVES COLOR RESPECTIVELY DIFFERENT FROM ONE ANOTHER TO TEXT AREA FOR EACH OF VARIOUS KINDS OF LANGUAGES OR SELECTIVELY DELETES TEXT AREA FOR EACH OF VARIOUS KINDS OF LANGUAGE

INCORPORATION BY REFERENCE

This application claims priority to Japanese Patent Application No. 2017-188779 filed on 28 Sep. 2017, the entire contents of which are incorporated by reference herein.

BACKGROUND

The present disclosure relates to image forming apparatuses that print images of original documents on recording sheets and particularly to a technique of printing a text area included in an image of an original document.

In image forming apparatuses, image scanning units scan images of original documents and image forming units print the images of the original documents on recording sheets. In addition, there is a known image forming apparatus that performs character recognition processing on an image of an original document scanned by an image scanning unit, determines the language of the recognized character, and sets the determined language as the language to be used in a display.

SUMMARY

A technique improved over the aforementioned technique is proposed herein as one aspect of the present disclosure.

An image forming apparatus according to the one aspect of the present disclosure includes an image scanning unit, an image forming unit, a text extraction section, an editing section, and a control section. The image scanning unit scans an image of an original document. The image forming unit forms the image of the original document scanned by the image scanning unit onto a recording sheet. The text extraction section extracts a text area containing a character of a language from the image of the original document for each of various kinds of languages. The editing section gives color respectively different from one another to the text area for each of the various kinds of languages or selectively deletes the text area for each of the various kinds of languages. The control section controls the image forming unit so as to cause the image forming unit to form the text area for each of the various kinds of languages on the recording sheet in respective color given to the text area for each of the various kinds of languages or to form a text area, which is among the text areas of the various kinds of languages and is not being deleted by the editing section, on the recording sheet.

BRIEF DESCRIPTION OF THE DRAWINGS

FIG. 5 is a view showing an initial screen displayed on a display unit.

FIG. 8 is a view conceptually showing a data table in which respective color to be given when each character of the various kinds of languages is printed and prohibition or permission of language color change processing for a text area containing color characters are registered.

DETAILED DESCRIPTION

Hereinafter, a description will be given of one embodiment of the present disclosure with reference to the drawings.

Figure 1:
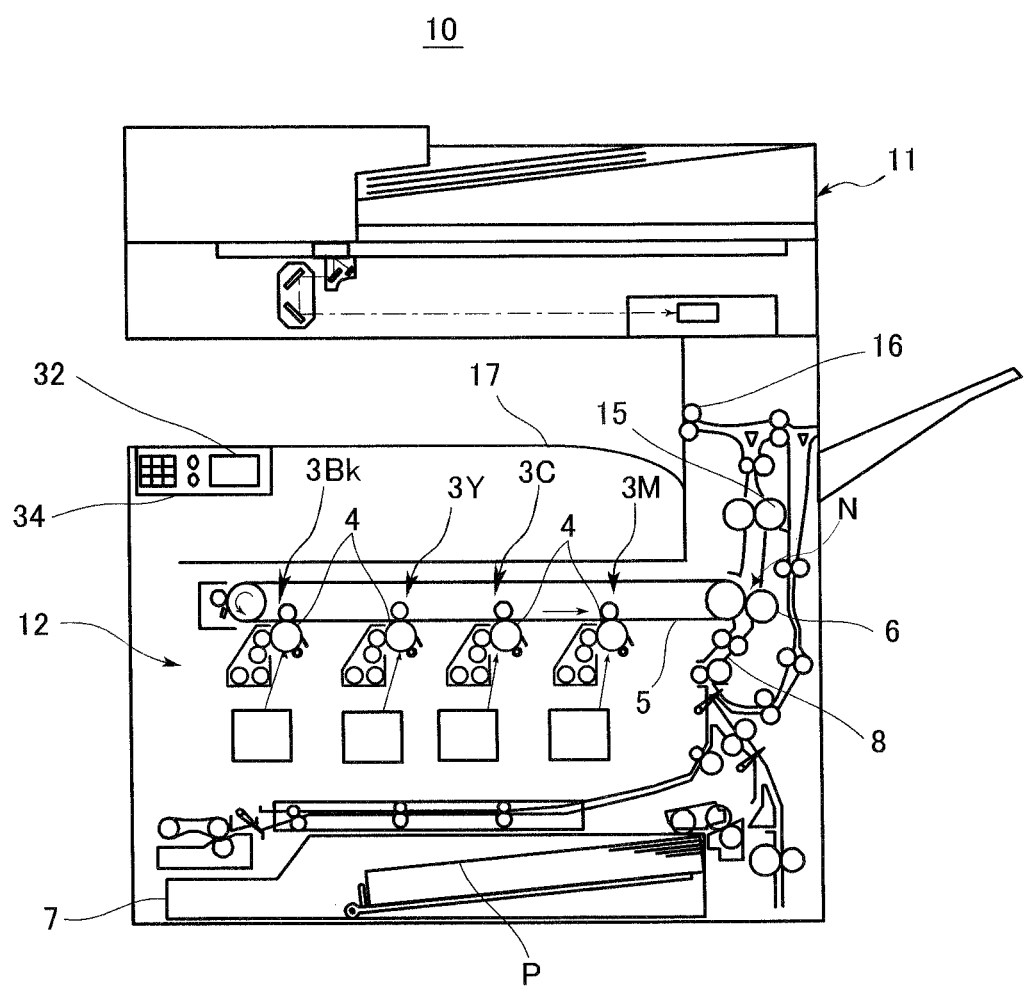
FIG. 1 is a sectional view showing an image forming apparatus according to one embodiment of the present disclosure.

FIG. 1 is a sectional view showing an image forming apparatus 10 according to one embodiment of the present disclosure. The image forming apparatus 10 is a multifunction peripheral (MFP) having a plurality of functions, such as copying, printing, scanning, and facsimile transmission. The image forming apparatus 10 includes an image scanning unit 11 and an image forming unit 12.

The image scanning unit 11 includes a scanner optically scanning an image of an original document, and converts an analogue signal outputted from an image pickup device of the scanner to a digital signal to thereby form image data showing the image of the original document.

The image forming unit 12 is configured to form an image based on the image data generated by the image scanning unit 11 or received from outside, on a recording sheet, and includes an image forming subunit 3M for magenta, an image forming subunit 3C for cyan, an image forming subunit 3Y for yellow, and an image forming subunit 3Bk for black. In each of the image forming subunits 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer belt 5. Thus, the color toner image is formed on the intermediate transfer belt 5. The color toner image is transferred to a recording sheet P transported along a transport route 8 from a paper feed unit 7, at a nip region N defined between the intermediate transfer belt 5 and a secondary transfer roller 6.

Thereafter, the recording sheet P is press-heated in a fixing device 15, so that the toner image on the recording sheet P is fixed by thermal compression, and then the recording sheet P is discharged to an output tray 17 through a discharge roller pair 16.

Figure 2:
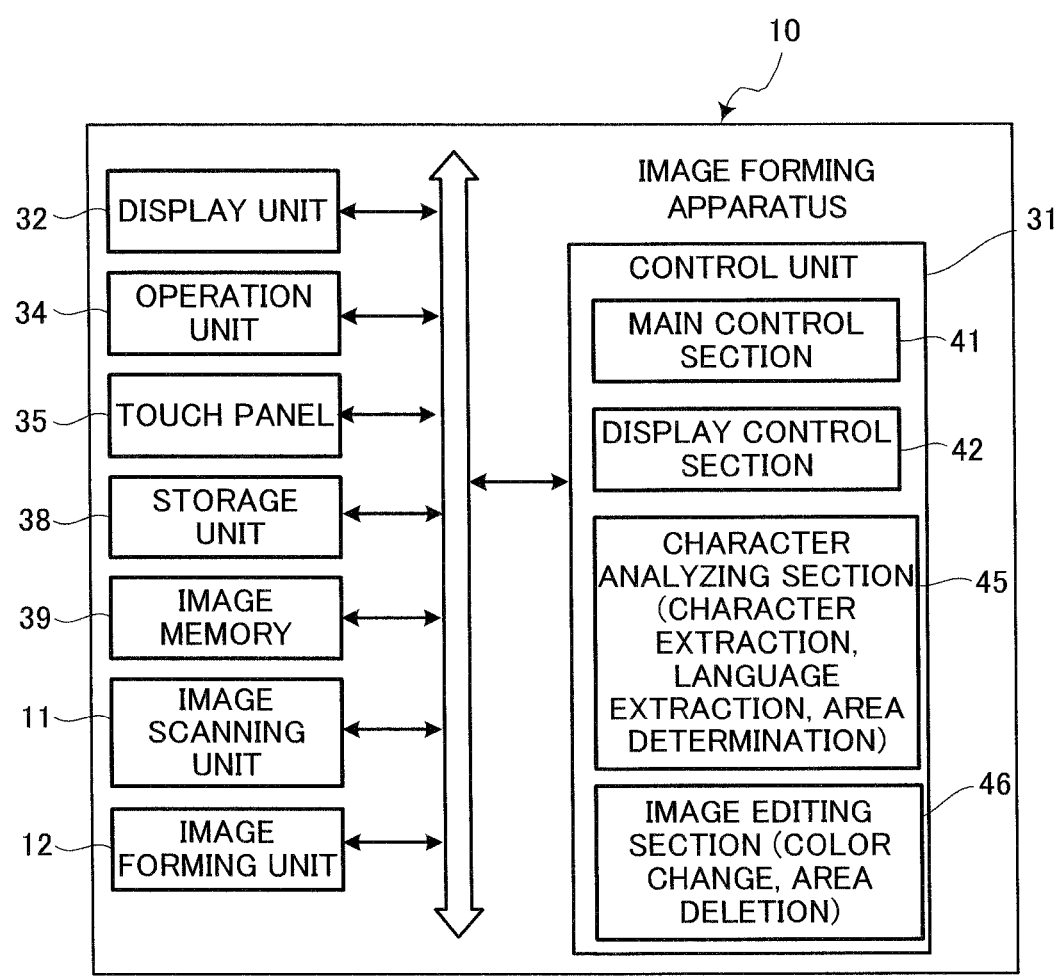
FIG. 2 is a functional block diagram showing an essential internal configuration of the image forming apparatus according to the one embodiment.

FIG. 2 is a functional block diagram showing an essential internal configuration of the image forming apparatus 10. As shown in FIG. 2, the image forming apparatus 10 includes a control unit 31, a display unit 32, an operation unit 34, a touch panel 35, a storage unit 38, an image memory 39, the image scanning unit 11, and the image forming unit 12. The mentioned components are configured to transmit and receive data or signals to and from each other, via a bus.

The display unit 32 is, for example, constituted of a liquid crystal display (LCD) or an organic light-emitting diode (OLED) display.

The operation unit 34 includes, for example, a menu key for invoking an initial screen of the display unit 32, and a start key, to receive an execution instruction for the image forming or original document reading, from the user.

A touch panel 35 is overlaid on a screen of the display unit 32. The touch panel 35 is based on a resistive film or electrostatic capacitance, and configured to detect a contact (touch) of a finger of the user, along with the touched position, to input the user's instruction to for example the GUI on the screen of the display unit 32. Accordingly, the touch panel 35 also serves as the operation unit 34 for inputting the user's operation performed on the screen of the display unit 32.

The storage unit 38 includes a large-capacity solid state drive (SSD) or a hard disk drive (HDD), and contains various data and programs.

The image memory 39 temporality stores, for example, image data showing the image of the original document scanned by the image scanning unit 11 and image data received from outside.

The control unit 31 includes a processor, a random-access memory (RAM), a read-only memory (ROM), and so forth. The processor is, for example, a central processing unit (CPU), an MPU, an ASIC, or the like. The control unit 31 includes the main control section 41, a display control section 42, a character analyzing section 45, and an image editing section 46. The mentioned components operate when a program stored on the ROM or the storage unit 38 is executed by the processor. Alternatively, the components each may be constituted in the form of a hardware circuit. The main control section 41, the character analyzing section 45, and the image editing section 46 correspond to "control section", "text extraction section", and "editing section" in What is claimed is, respectively.

The main control section 41 governs the overall operation control of the image forming apparatus 10. The display control section 42 controls the display unit 32 so as to cause the display unit 32 to display the GUI and various kind of information.

The character analyzing section 45 performs, for example, a layout analysis for an image shown by image data stored on the image memory 39 and extracts a text area (a part of the image shown by the image data). The character analyzing section 45 performs, for example, optical character recognition (OCR) processing on the image included in the extracted text area to thereby recognize the character included in the image. For example, a character database DB saved on the storage unit 38 stores characters of various kinds of languages and the character analyzing section 45 uses a known technique of determining which character of the language that the recognized character matches to, and determines a language kind of the recognized character.

In another example, a character database DB, where a plurality of character patterns to be used for pattern matching are registered, may be stored on the storage unit 38 for each of various kinds of languages, and the character analyzing section 45 performs the pattern matching on a character image contained in the text area by using each of the character patterns registered on the character database DB to compare each of the character patterns with the character image, to thereby find the character pattern approximating the character image. The character analyzing section 45 determines that the language indicated by the approximating character pattern is the language kind of the character image.

In the case where the text area contains characters of various kinds of languages, the character analyzing section 45 separates the text area by each of the kinds of languages.

The image editing section 46 performs various kinds of image processing on the image data stored on the image memory 39: for example, the image editing section 46 performs processing of giving color respectively coloring different from one another to text areas of the various kinds of language or performs processing of selectively deleting at least one of the text areas of the various kinds of languages.

In the image forming apparatus 10 configured as above, a user operates the operation unit 34 and the touch panel 35 to select the copy function, the printer function, or the scanner function, and the user can have the job according to the selected function to be executed. For example, when the user selects the copy function and instructs execution of the job according to the copy function, the main control section 41 causes the image scanning unit 11 to scan an image of an original document, causes the image memory 39 to temporarily store the image data showing the image of the original document, causes the image data to be inputted from the image memory 39 to the image forming unit 12, and causes the image forming unit 12 to print the image of the original document on the recording sheet. Similarly, also with respect to the printer function and the scanner function, the main control section 41 can cause the image memory 39 to temporarily store the image data showing the image of the original document, cause the image data to be inputted to the image forming unit 12, and cause the image forming unit 12 to print the image of the original document on the recording sheet.

In the present embodiment, the user can turn on and off operation of the character analyzing section 45 and the image editing section 46. When the operation of the character analyzing section 45 and the image editing section 46 is in an on-state, the character analyzing section 45 extracts the text area containing the character of the language from the image shown by the image data stored on the image memory 39 for each of various kinds of languages, and the image editing section 46 gives color respectively different from one another to the text area for each of the various kinds of languages or selectively deletes the text area for each of the various kinds of languages. The main control section 41 controls the image forming unit 12 so as to cause the image forming unit 12 to form the text areas of the various kinds of languages on the recording sheet in respective color given to the text areas of the various kinds of languages or to form a text area, which is among the text areas of the various kinds of languages and is not being deleted by the editing section 46, on the recording sheet.

Figure 3A:
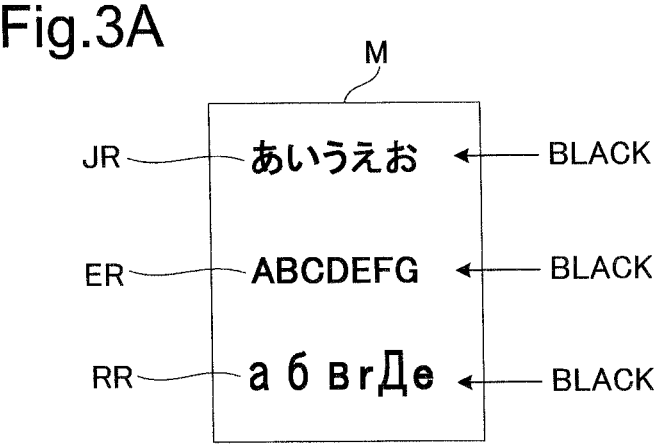
FIG. 3A is a view showing text areas of various kinds of languages included in an image of an original document.
Figure 3B:
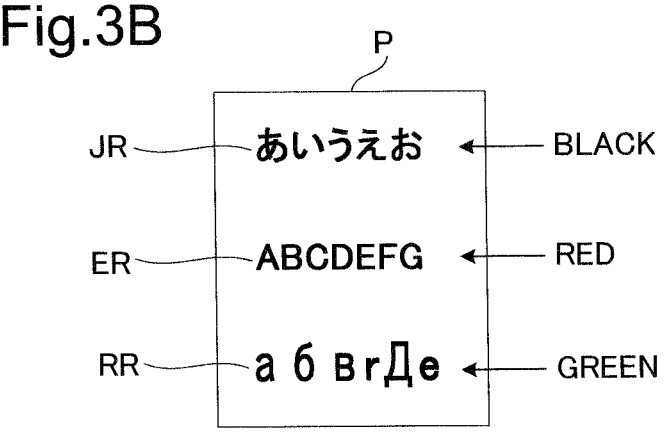
FIG. 3B is a view showing a state where color of characters contained in the text areas of the various kinds of languages is being changed.

For example, in the case where an image of an original document M includes a Japanese text area JR, an English text area ER, and a Russian text area RR all by an image with single color of black as shown in FIG. 3A, the above processing enables each of the characters of the Japanese text area JR to be printed in black on the recording sheet P without change in a character color as shown in FIG. 3B. The above processing also enables each of the characters of the English text area ER to be printed in red and each of the characters of the Russian text area RR to be printed in green.

Figure 3C:
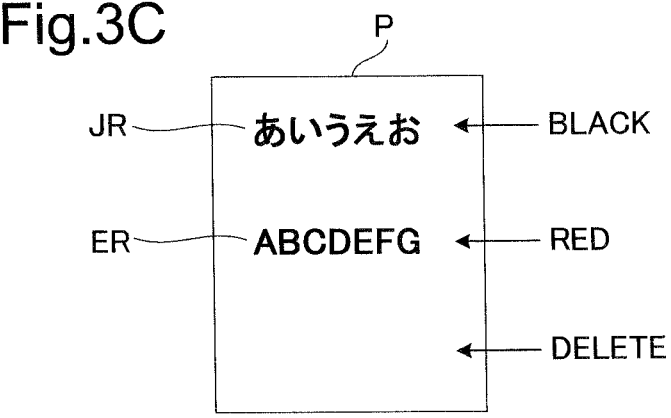
FIG. 3C is a view showing a state where one of the text areas of the various kinds of languages is being selectively deleted.

Therefore, anyone who sees the recording sheet P can clearly distinguish among three languages printed on the recording sheet P. As shown in FIG. 3C, it is also possible to print each of the characters of the Japanese text area JR in black and to print each of the characters of the English text area ER in red on the recording sheet P, and further, it is possible to delete the Russian text area RR. In other words, if printing of Russian is unnecessary, the Russian text area RR is to be deleted.

Furthermore, in FIG. 3C, when the meaning described in the Japanese text area JR is identical with the description in the English text area ER, by overlaying or removing a red transparent sheet on the recording sheet P, it is possible to make only the English text area ER invisible or visible, so that the recording sheet P can be used for studying English.

Figure 4A:
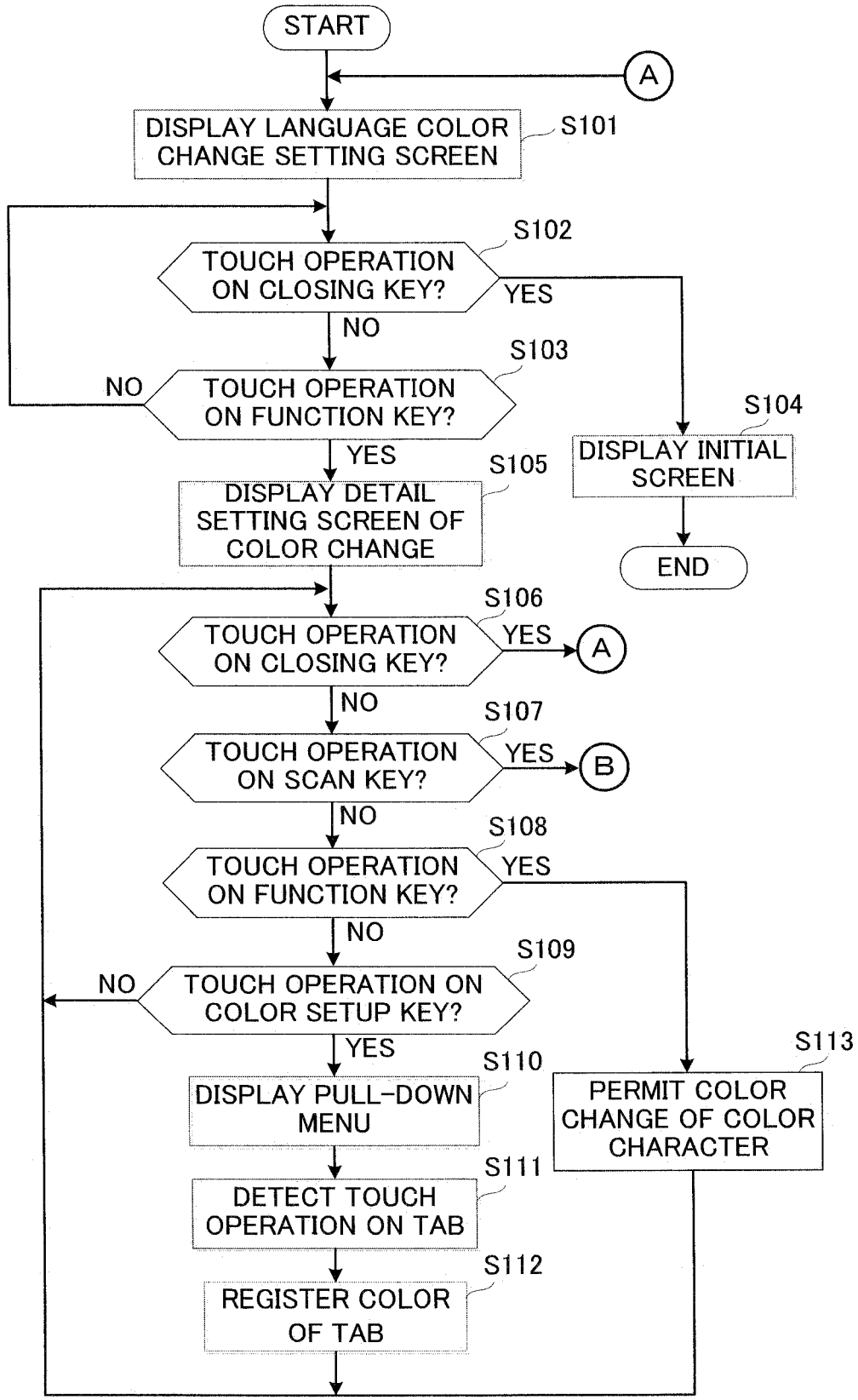
FIG. 4A is a flowchart showing processing procedures of giving color respectively different from one another to the text areas of the various kinds of languages or selectively deleting at least one of the text areas of the various kinds of languages.
Figure 4B:
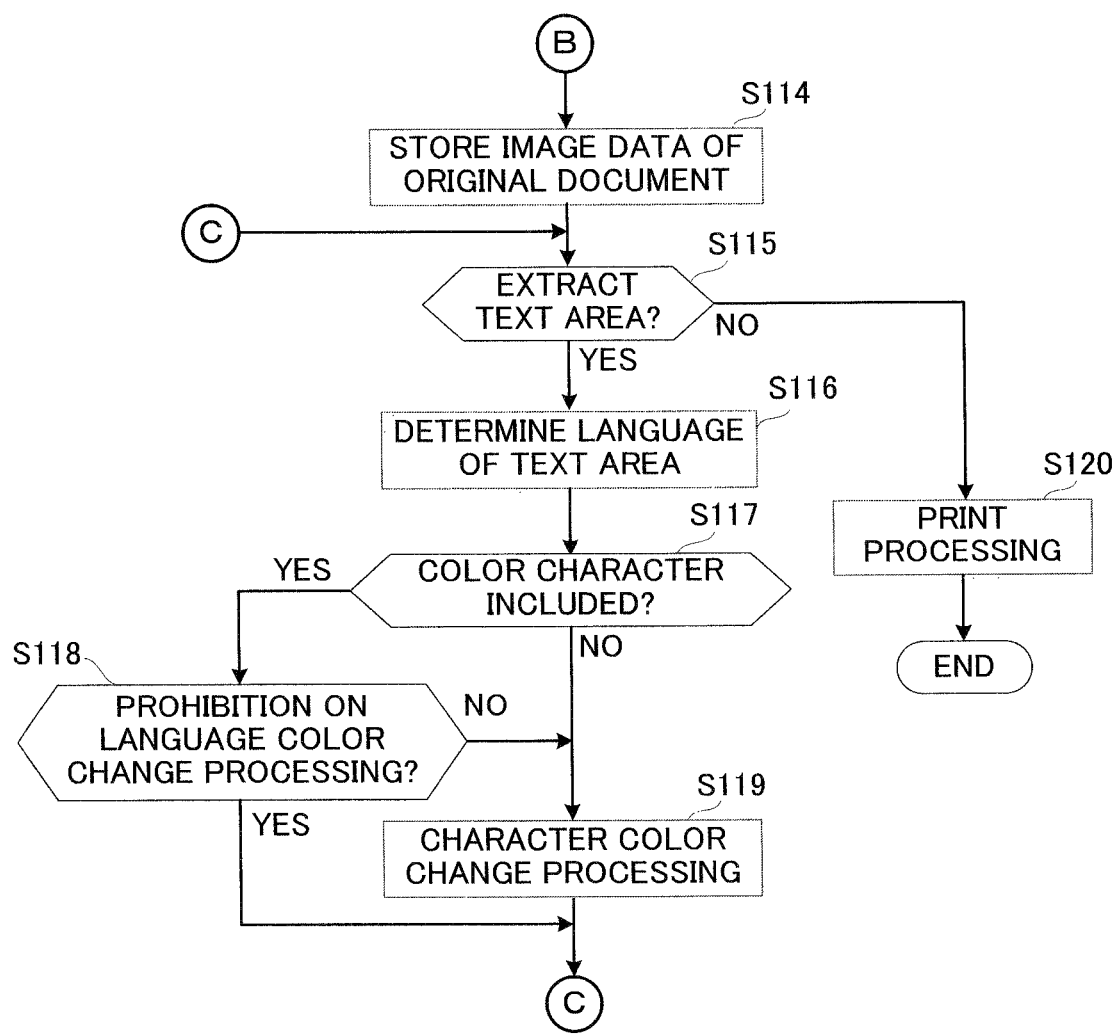
FIG. 4B is a flowchart showing processing procedures following FIG. 4A.

Next, with reference to flowcharts shown in FIGS. 4A and 4B, descriptions will be given to processing procedures of giving color respectively different from one another to the text areas of the various kinds of languages or selectively deleting at least one of the text areas of the various kinds of languages.

Figure 6:
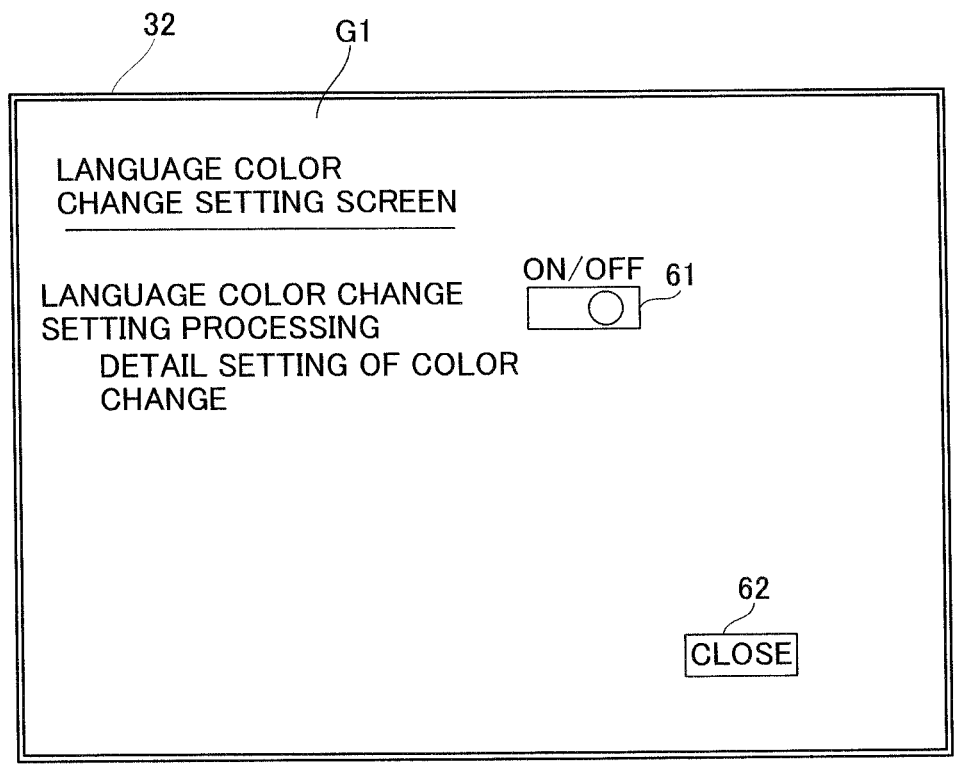
FIG. 6 is a view showing a language color change setting screen displayed on the display unit.

The display control section 42 causes the display unit 32 of the image forming apparatus 10 to display as the initial screen a plurality soft key 51a to 51d as shown in FIG. 5. Each of the soft keys 51a to 51d is related to respective function. When the user performs a touch operation on the soft key 51d (language color changing key) corresponding to a language color changing function at this point, the main control section 41 receives through the touch panel 35 the touch operation performed on the soft key 51d and the display control section 42 causes the display unit 32 to display on the screen thereof the language color change setting screen G1 as shown in FIG. 6 (step S101). On a language color change setting screen G1, a function key 61 through which instructions for manually turning the language color change processing on and off are received and a closing key 62 through which instructions for closing the screen are received are displayed.

Figure 7:
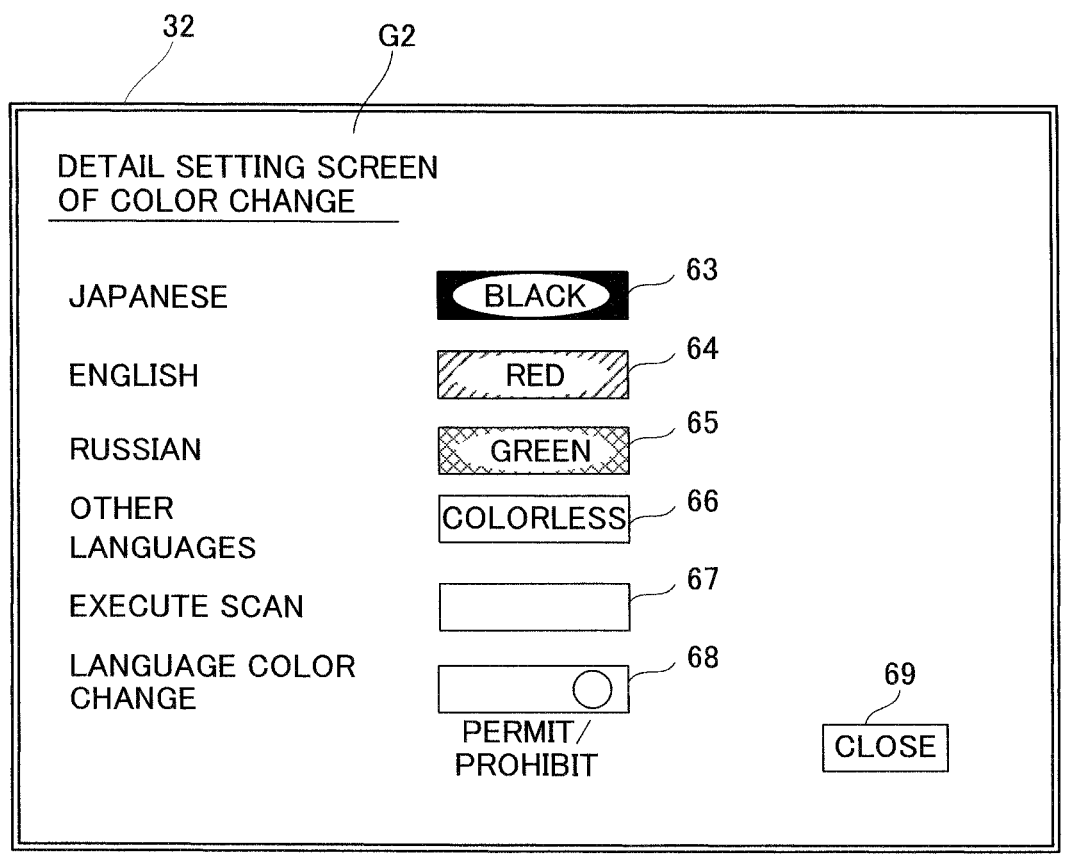
FIG. 7 is a view showing a detail setting screen of color change displayed on the display unit.

When the user performs the touch operation on the function key 61 to thereby switch the language color change processing from an off state to an on state, the main control section 41 detects the touch operation on the function key 61 (YES in step S103) through the touch panel 35 and causes the language color change processing to be started. The display control section 42 causes the display unit 32 to display on the screen thereof a detail setting screen G2 of color change as shown in FIG. 7 (step S105).

The following are displayed on the detail setting screen G2 of color change: a color setup key 63 for receiving a color setting for Japanese; a color setup key 64 for receiving a color setting for English; a color setup key 65 for receiving a color setting for Russian; a color setup key 66 for receiving a color setting for other languages; a scan key 67; a function key 68 for prohibiting or permitting the language color change processing performed on a text area originally containing color characters; and a closing key 69. In this embodiment, Japanese, English, and Russian are exemplified, but a color setup key corresponding to each of more kinds of languages may be provided.

Each of the color setup key 63, 64, 65, and 66 is displayed in the color of the respective characters of the languages which is used when the respective characters are subjected to the language color change processing and printed on the recording sheet. For example, the color setup key 63 for Japanese is displayed in black which is the color used when the characters in Japanese are subjected to the language color change processing and printed; the color setup key 64 for English is displayed in blue which is the color used when the characters in English are subjected to the language color change processing and printed; and the color setup key 64 for Russian is displayed in red which is the color used when the characters in Russian are subjected to the language color change processing and printed. In addition, the color setup key 66 for other languages is colorlessly displayed (the color same as the ground color of the detail setting screen G2 of color change). If the color of each of the languages is set as colorless through operations on the color setup key 63, 64, 65, and 66, the image editing section 46 deletes the characters of the language being set as colorless and contained in the text area.

When the text area in the image of the original document originally includes color characters, the function key 68 serves as a key that receives an instruction as to whether or not to change the character to the display color of the color setup key corresponding to the language of the character. In the image forming apparatus 10, it is assumed that the language color change processing on the text area containing the color character is prohibited by the main control section 41 in default setting. In such the case, the color characters in the text area are printed on the recording sheet in the color as it is without being changed into the display color of the color setup key corresponding to the language of the character (i.e., a normal printing, in which the language color change processing is not performed, is carried out).

In the case where the instruction to release the prohibition of the language color change processing on the text area containing the color character is inputted by the operation of the function key 68, the language color change processing, in which the color characters in the text area is changed into the display color of the color setup key corresponding to the language of the character, is performed and the image after the processing is printed on the recording sheet.

FIG. 8 is a view conceptually showing a data table DT: in the data table DT, the display color of each of the color setup keys 63, 64, 65, and 66 (that is, color to be given when each of the characters of the various kinds of languages is printed) and prohibition or permission regarding performing the language color change processing on the text area containing color characters are registered. The data table DT is stored in the storage unit 38. The main control section 41 rewrites contents of the data table DT to the color instructed by the user through the operation of the operation unit 34.

The main control section 41 is standing by for the touch operation performed on the closing key 69, the scan key 67, the function key 68, or each of the color setup keys 63 to 66 (step S106 to step S109). When, for example, the user performs touch operation on the closing key 69, the main control section 41 detects the touch operation on the closing key 69 through the touch panel 35 (YES in step S106), closes the detail setting screen G2 of color change through the display control section 42, and causes the display unit 32 to display the language color change setting screen G1. The process then goes back to step S101.

Figure 9:
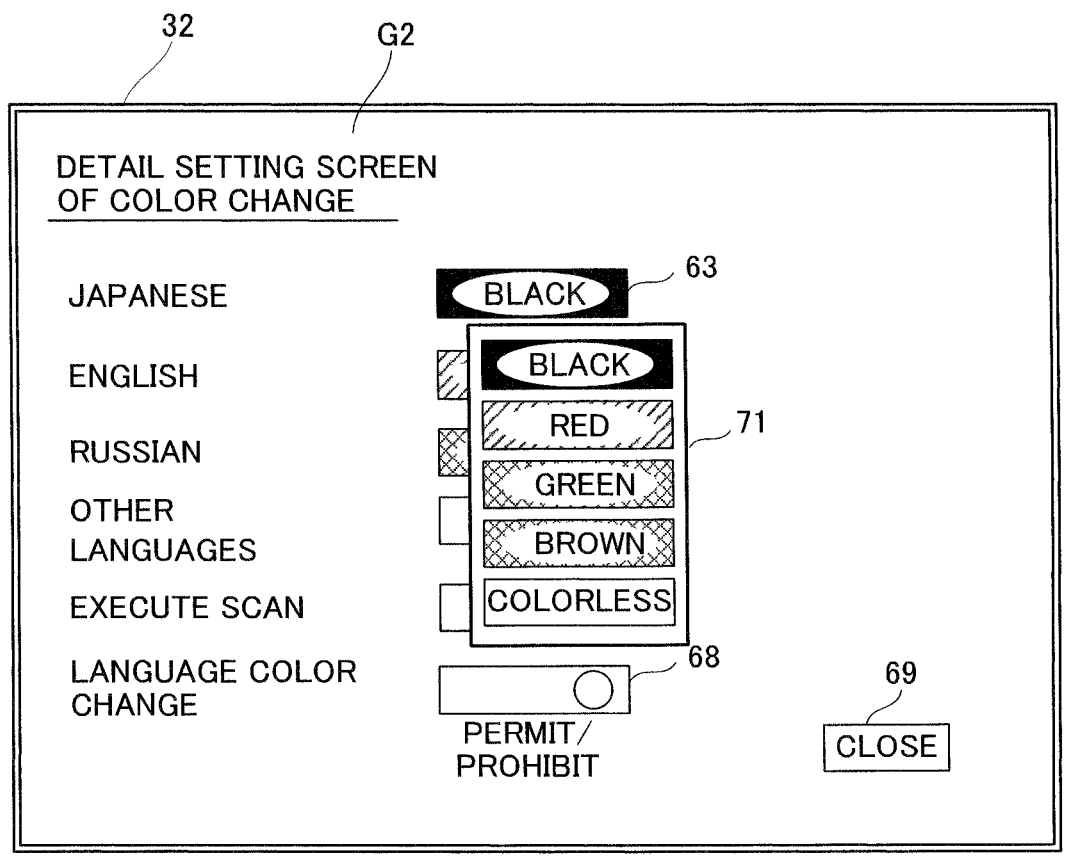
FIG. 9 is a view showing a state where the detail setting screen of color change is being operated.

Additionally, when for example the user performs the touch operation on the color setup key 63 for Japanese, the main control section 41 detects the touch operation on the color setup key 63 through the touch panel 35 (NO in steps S106 to S108 and YES in step S109). For example, in responding the touch operation performed on the color setup key 63, the display control section 42 causes the display unit 32 to display, a pull-down menu 71 below the color setup key 63 as shown in FIG. 9 (step S110): in the pull-down menu 71, tabs of mutually different color (including colorless) are vertically arranged. When the user performs the touch operation on any of the tabs each representing the color of the pull-down menu 71 under this state, the main control section 41 detects the touch operation on the touched color on the tab through the touch panel 35 (step S111), the display control section 42 undisplays the pull-down menu 71, causes the color setup key 63 for Japanese to be displayed in the touched color, and changes the display color of the color setup key 63. The main control section 41 registers the touched color as the color of the characters of Japanese included in the data table DT shown in FIG. 8 (step S112). Thereafter, the process goes back to step S106.

The main control section 41 changes each of the display color of the color setup key 64 for English, the color setup key 64 for Russian, and the color setup key 66 for other kinds of languages to the touched color by the same process as described above. At the same time, the color of the language corresponding to each of the color setup keys included in the data table DT shown in FIG. 8 is also changed to the color of the tab by the display control section 42.

When the user touches the function key 68 to thereby release the prohibition of the language color change processing performed on the text area originally containing the color character, the main control section 41 detects the touch operation performed on the function key 68 through the touch panel 35 (YES in step S108), and rewrites the data table DT shown in FIG. 8 so that "prohibition" of the language color change processing on the text area containing the color character is changed to "permitted" (step S113). Thereafter, the process goes back to step S106.

After the contents of the data table DT are set appropriately as described above, when the user sets an original document on the image scanning unit 11 and performs touch operation on the scan key 67, the main control section 41 detects the touch operation performed on the scan key 67 through the touch panel 35 (YES in step S107) and activates the image scanning unit 11. The image scanning unit 11 scans the image of the original document and generates the image data showing the image of the original document. Here, it is assumed that the image scanning unit 11 scans the image of the original document in color. The main control section 41 causes the image memory 39 to store the image data (step S114).

The character analyzing section 45 performs, for example, layout analysis on the image of the original document shown by the image data stored on the image memory 39 and extracts a text area (YES in step S115) and determines the language kind of the characters contained in the text area (step S116). The determined language is considered as the language of the text area.

When the character analyzing section 45 extracts the text area, the image editing section 46 determines whether the text area includes color characters (step S117). Upon determining that the color characters are included (YES in step S117), the image editing section 46 decides whether the language color change processing has been stored, on the data table DT shown in FIG. 8, as either "prohibit" or "permit" with respect to the text area containing the color character (step S118). Upon determining that the language color change processing is prohibited (YES in step S118), the image editing section 46 does not perform the character color change processing on the text area (step S119).

Upon determining that the color characters are not included in the text area (NO in step S117) or the language color change processing on the text area containing the color character is permitted (NO in step S118), the image editing section 46 reads out, with reference to the data table DT shown in FIG. 8, the character color stored in association with the language kind of the text area having been determined in step S116, and performs the language color change processing in which the color of the character contained in the text area is to be changed to the color having been read out (step S119). Thereafter, the process goes back to step S115. In this language color change processing, if the color having been read out is "colorless", the image editing section 46 deletes the characters contained in the text area.

Thereafter, the processing of step S115 is performed similarly, and when other text area is extracted from the image indicated by the image data stored on the image memory 39 by the character analyzing section 45 (YES in step S115), the processing of steps S116 to S119 is repeatedly performed on the extracted text area.

When the character analyzing section 45 no longer extracts text areas from the image indicated by the image data stored on the image memory 39 (NO in step S115), in other words, after all the text areas are extracted, the main control section 41 controls the image forming unit 12 so as to print the image indicated by the image data stored on the image memory 39 on the recording sheet (S120).

In displaying the language color change setting screen G1 shown in FIG. 6, when the main control section 41 detects the touch operation on the closing key 62 performed by the user through the touch panel 35 (YES in step S102), the display control section 42 closes the language color change setting screen G1 and causes the display unit 32 to display the initial screen shown in FIG. 5 (step S104), then ends the processing.

As a result of the processing, in the case of the image of the original document M shown in FIG. 3A, each character on the Japanese text area JR, each character on the English text area ER, and each character on the Russian text area RR are printed on the recording sheet P in black, red, and green, respectively, as shown in FIG. 3B.

The above embodiment refers to the case where the color settings corresponding to each of the languages is black, red, and green. If there is a language whose color setting is colorless, the image editing section 46 deletes the characters in language being set as colorless and included in the text area. Therefore, if the color setting corresponding to Russian is set as colorless, as shown in FIG. 3C, each character on the Japanese text area JR is printed in black and each character on the English text area ER is printed in red on the recording sheet P, and, furthermore, each character on the Russian text area RR is deleted.

In the case where the image of the original document includes a plurality of text areas each having characters of various kinds of languages, all of these text areas are to be printed. Depending on the purpose, however, it is desired to print the text areas on the recording sheet so as the language kinds are to be clearly distinguishable, or it is desired to print the text areas on the recording sheet so as to exclude a specific language. Regardless of the desire, generally, determination of the language of the characters included in the image of the original document is performed, but reflecting the determination result on the recording sheet and printing is not performed.

As thus far described, the present embodiment extracts each of the text areas of the various kinds of languages from the image of the original document scanned by the image scanning unit 11, gives color respectively different from one another to the text areas of the various kinds of languages or selectively deletes at least one of the text areas of the various kinds of languages, prints on the recording sheet, by the image forming unit 12, the characters included in the text areas of the various kinds of languages in respective color given to the text areas of the various kinds of languages, or prints the text area, which is among the text areas of the various kinds of languages and is not being deleted, on the recording sheet. Accordingly, when the image of the original document includes the text areas of the various kinds of languages, it is possible to print the text areas on the recording sheet so as the respective language kinds are to be clearly distinguishable, or to delete the specific language and print the text areas on the recording paper.

In the above embodiment, the character analyzing section 45 recognizes all the characters included in the image of the original document, but once the language kind of the text area is identified, it is possible to perform the giving of color to the text areas and deleting of the text areas. Thus, all of the characters do not have to be identified. For example, the character analyzing section 45 may be configured so as to, by the language kinds, preliminary select a predetermined character having a high use frequency and being unique to the language and cause the storage unit 38 to store the predetermined character, and upon extraction of the predetermined character, to determine that the language kind of the character contained in the text area is the language to which the predetermined character belong. In the case of Japanese, for example, the character analyzing section 45 may select the letter は or を as the predetermined character and cause the storage unit 38 to store the predetermined character, and upon extraction of the letter は or を from a text area, determine that the language kind of the text area is Japanese.

Figure 10:
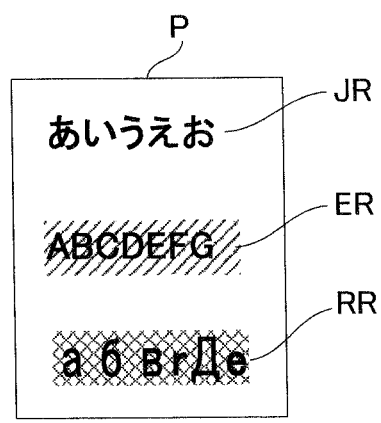
FIG. 10 is a view showing a state where background color of the text areas of the various kinds of languages is being changed.

Furthermore, in the above embodiment, the characters in the text area are printed on the recording sheet in the color given to the text area for each of the various kinds of languages, but instead of the configuration, the image editing section 46 may be configured so as to generate an image in which the background of the character in the text area is the color given to the text area and the main control section 41 may be configured to cause the image forming unit 12 to print the image of the text area including the image on the recording sheet. For example, as shown in FIG. 10, each of the characters of the Japanese text area JR is printed in black on the recording sheet along with the background the color of which is lighter black than the character: each of the characters of the English text area ER is printed in black on the recording sheet along with the background the color of which is red: each of the characters of the Russian text area RR is printed in black on the recording sheet along with the background the color of which is green.

Figure 11:
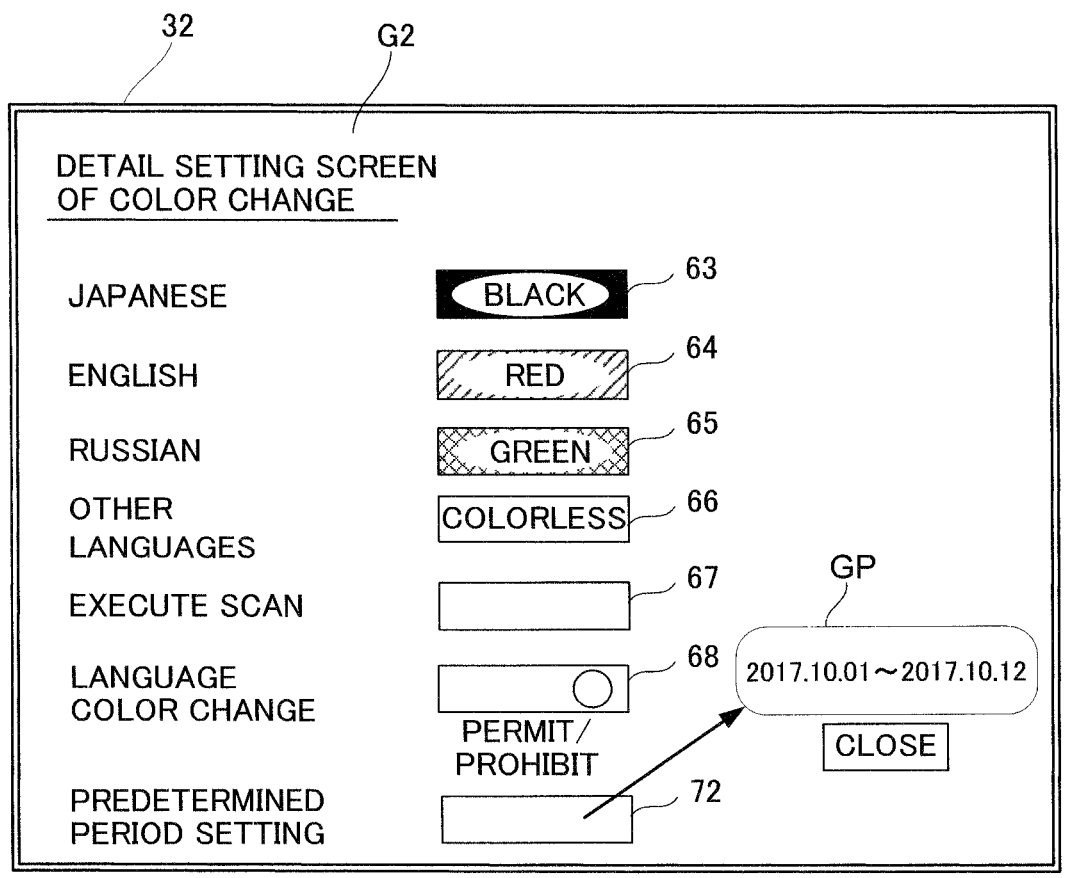
FIG. 11 is a view showing a modified example of the detail setting screen of color change.

Still farther, the main control section 41 may be configured so as to maintain the operation of the character analyzing section 45 and the image editing section 46 in the on-state for a fixed period set by the user. For example, as shown in FIG. 11, the display control section 42 causes the display unit 32 to display to add and display, on the detail setting screen G2 of color change, a period key 72 to be used to instruct the setting of the fixed period. When the user performs touch operation on the period key 72, the main control section 41 detects through the touch panel 35 the touch operation performed on the period key 72 and the display control section 42 causes the display unit 32 to display a pop-up screen GP to be used to set the fixed period.

When the fixed period is entered on pop-up screen GP by the user's operation, the main control section 41 maintains the operation of the character analyzing section 45 and the image editing section 46 in the on-state for the fixed period. In this case, even when the user does not perform touch operation on the soft key 51d corresponding to the setting of the language color change in the initial screen shown in FIG. 5, the processing of step S114 and subsequent processing can be executed when the user performs touch operation on the scan key 67 under the state where the display control section 42 causing the display unit 32 to display the detail setting screen G2 of color change shown in FIG. 7 at the time point when the user sets an original document on the image scanning unit 11 and an un-illustrated sensor detects the original document. In a facility where various people using plural kinds of languages gather together, such as a foreign language school, if the operation of the character analyzing section 45 and the image editing section 46 is maintained in the on-state in a period during which copying of documents is frequent (for example an examination period), operation can be simplified.

Figure 12A:
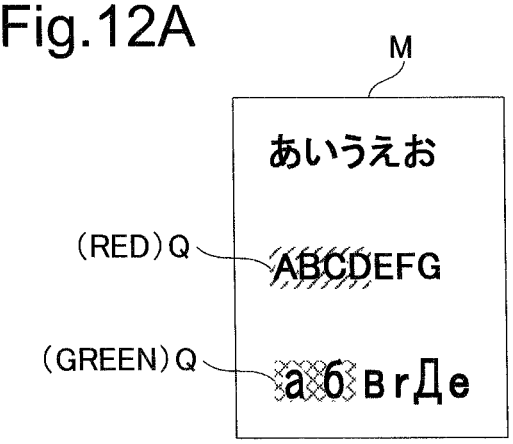
FIG. 12A is a view showing an image of the original document on which a marker is drawn.

Still farther, instead of setting the respective color corresponding to each of the languages by using the detail setting screen G2 of color change shown in FIG. 7, a marker Q may be marked on the character or character string on the original document as shown in FIG. 12A and the image scanning unit 11 may scan the marker Q or the character (or character string) marked with the marker Q on the original document and the character analyzing section 45 may analyze the color of the marker Q and associate the color of the marker Q with the language of the character or character string.

In this case, every time the character analyzing section 45 extracts the text area from the image of the original document indicated by the image data stored on the image memory 39, the character analyzing section 45 recognizes characters from the text area and, based on the recognized character, determines the color of the image portion of the marker Q along with determining the language kind of the character.

Figure 12B:
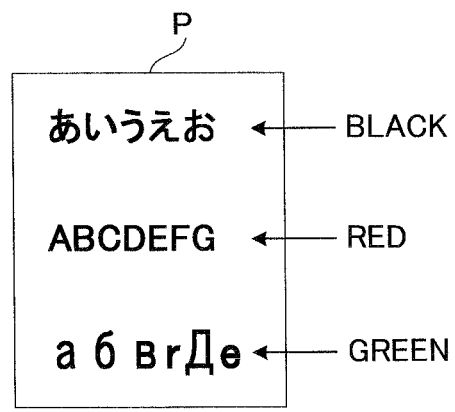
FIG. 12B is a view showing a state where color of the characters contained in the text areas is being changed into color of the marker and where an image representing the marker is being deleted.

When the character analyzing section 45 determines the color of the image portion of the marker Q along with determining the language kind of the character, the main control section 41 changes the color associated with the determined language to the color of the marker Q and registers on the data table DT shown in FIG. 8. Furthermore, the image editing section 46 performs, on the image data, image processing of leaving only the characters of the marked part based on the density difference between the character image and the marker, setting the character part to the color of the marker Q, and deleting the image indicating the marker. As shown in FIG. 12B, based on the image data, the main control section 41 causes the image forming unit 12 to print on the recording sheet each of the characters contained in the text area in the color that corresponds to the language kind: the processing is performed for each of the text areas of the various kinds of languages.

Thereafter, every time the character analyzing section 45 determines the text area, the image editing section 46 references the data table DT shown in FIG. 8 to read out the character color of the language on the text area, and performs processing of changing the character color of the language on the text area to the color having been read out on the image data. The main control section 41 causes the image forming unit 12 to print, based on the image data, for each of the text areas of the various kinds of languages, each of the characters on the text area in the color corresponding to the language kind on the recording sheet.

The configuration and processing described in the above embodiment with reference to FIGS. 1 to 12 are merely exemplary, and not intended to limit the scope of the disclosure.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an image scanning unit that scans an image of an original document;
   an image forming unit that forms the image of the original document scanned by the image scanning unit onto a recording sheet; and
   a control unit that includes a processor and, through the processor executing a control program, acts as:
      a text extraction section that extracts a text area containing a character of a language from the image of the original document for each of various kinds of languages;
      an editing section that gives color respectively different from one another to the text area for each of the various kinds of languages or selectively deletes the text area for each of the various kinds of languages; and
      a control section that controls the image forming unit so as to cause the image forming unit to form the text area for each of the various kinds of languages on the recording sheet in respective color given to the text area for each of the various kinds of languages or to form a text area, which is among the text areas of the various kinds of languages and is not being deleted by the editing section, on the recording sheet,
   wherein the text extraction section identifies a marker drawn on the original document and color of the marker, recognizes a character at a position where the marker is drawn, and determines a language kind that corresponds to the recognized character, and extracts the text area containing the character of the determined language kind from the image of the original document,
   the editing section gives the color of the marker to the text area, and
   the control section controls the image forming unit so as to cause the image forming unit to form the text area on the recording sheet in the color of the marker given to the text area.

2. The image forming apparatus according to claim 1, wherein the editing section gives the color of the marker to the character contained in the text area and deletes an image representing the marker included in the text area.

3. The image forming apparatus according to claim 1, wherein the editing section identifies color of the character in the image of the original document and when the color of the character in the image of the original document is other color besides black, the editing section does not give color to the text area containing the character.

4. The image forming apparatus according to claim 3 further comprising an operation unit that is operated by a user for a purpose of prohibiting or permitting the giving of color to the text area containing the character in the other color, wherein
   when giving of color to the text area containing the character in the other color is prohibited by operation of the operation unit and the color of the character in the image of the original document is the other color, the editing section does not give color to the text area containing the character.

5. The image forming apparatus according to claim 4, wherein when giving of color to the text area containing the character in the other color is permitted by the operation of the operation unit, the editing section gives color to the text area containing the characters even if the color of the character in the image of the original document is the other color.

6. An image forming apparatus comprising:
   an image scanning unit that scans an image of an original document;
   an image forming unit that forms the image of the original document scanned by the image scanning unit onto a recording sheet;
   a control unit that includes a processor and, through the processor executing a control program, acts as:
      a text extraction section that extracts a text area containing a character of a language from the image of the original document for each of various kinds of languages;
      an editing section that gives color respectively different from one another to the text area for each of the various kinds of languages or selectively deletes the text area for each of the various kinds of languages; and
      a control section that controls the image forming unit so as to cause the image forming unit to form the text area for each of the various kinds of languages on the recording sheet in respective color given to the text area for each of the various kinds of languages or to form a text area, which is among the text areas of the various kinds of languages and is not being deleted by the editing section, on the recording sheet; and
   an operation unit that is operated by a user for a purpose of performing turning on or off of operation of the text extraction section and the editing section,
   wherein the control section maintains the operation of the text extraction section and the editing section in an on-state for a predetermined period, and when the operation of the text extraction section and the editing section is turned off by operation of the operation unit, the control section controls the image forming unit so as to cause the image forming unit to form the image of the original document on the recording sheet without causing the text extraction section and the editing section to perform respective processing,
   the operation unit is operable by the user for a purpose of setting the predetermined period, and
   when the predetermined period is set by the operation of the operation unit, the control section maintains, for the predetermined period, the operation of the text extraction section and the editing section in the on-state, even if the operation to turn on or off is not performed by the operation unit.

* * * * *